(12) United States Patent
Houck

(10) Patent No.: US 10,189,605 B2
(45) Date of Patent: Jan. 29, 2019

(54) DEBRIS PROTECTED TWIST ATTACHMENT

(71) Applicant: GM GLOBAL TECHNOLOGY OPERATIONS LLC, Detroit, MI (US)

(72) Inventor: Thomas E. Houck, Bloomfield Hills, MI (US)

( * ) Notice: Subject to any disclaimer, the term of this patent is extended or adjusted under 35 U.S.C. 154(b) by 169 days.

(21) Appl. No.: 15/097,434

(22) Filed: Apr. 13, 2016

(65) Prior Publication Data

US 2017/0297771 A1    Oct. 19, 2017

(51) Int. Cl.
    *B65D 25/28*    (2006.01)
    *B60R 5/04*    (2006.01)
    *B66C 1/66*    (2006.01)
    *F16B 21/02*    (2006.01)

(52) U.S. Cl.
    CPC ............ *B65D 25/2802* (2013.01); *B60R 5/04* (2013.01); *B66C 1/66* (2013.01); *B66C 1/663* (2013.01); *F16B 21/02* (2013.01)

(58) Field of Classification Search
    CPC ............ B65D 25/2867; B65D 25/2882; B65D 25/2802; B65D 25/22; B65D 25/20; B65D 25/2823; B65D 25/2826; B65D 25/2855; B65D 25/2873; B65D 25/2876; B65D 25/2888; B65D 1/015; B60R 5/04; A01B 1/026; A23H 33/04; A45F 5/10; B66C 1/62; B66C 1/66; B66C 1/663; F16B 21/12

USPC ...... 70/DIG. 34, 35; 220/770; 411/349, 549, 411/553
See application file for complete search history.

(56) References Cited

U.S. PATENT DOCUMENTS

| | | | | |
|---|---|---|---|---|
| 3,501,193 A * | 3/1970 | Gray | ...................... | B66C 1/663 |
| | | | | 294/81.53 |
| 5,004,071 A * | 4/1991 | Mallard | .................. | A62B 35/04 |
| | | | | 182/3 |
| 5,163,726 A * | 11/1992 | Boos | ....................... | B66C 1/663 |
| | | | | 294/67.1 |
| 8,177,463 B2 * | 5/2012 | Walker | ............... | B65D 90/0006 |
| | | | | 410/32 |
| 9,790,023 B2 * | 10/2017 | Omuta | ................... | B65D 88/12 |

* cited by examiner

*Primary Examiner* — Anthony D Stashick
*Assistant Examiner* — James M Van Buskirk
(74) *Attorney, Agent, or Firm* — Quinn IP Law

(57) ABSTRACT

A detachable attachment assembly has a receptacle unit and a carrier unit. The receptacle unit includes a housing defining a receptacle slot and a piston having a profile substantially matching the receptacle slot. The piston is movable between an engaged position, proximal the receptacle slot, and a retracted position, distal to the receptacle slot. A biasing member biases the piston toward the engaged position. A flange of the carrier unit has a width greater than the length of the receptacle slot. A lock tab is offset from the flange and is configured to pass through the receptacle slot. A first angle of the carrier unit lets the lock tab move the piston from the engaged position to the retracted position. A second angle prevents passage of the lock tab through the receptacle slot. An accessory is attached to the carrier unit.

16 Claims, 3 Drawing Sheets

DEBRIS PROTECTED TWIST ATTACHMENT

TECHNICAL FIELD

This disclosure generally relates to removable attachment fixtures.

BACKGROUND

Cargo areas for mobile and fixed platforms may include attachment fixtures or structures. These attachments are often built directly into the cargo area and are neither movable nor changeable.

SUMMARY

A detachable attachment assembly is provided. The attachment assembly has at least a receptacle unit and a carrier unit.

The receptacle unit includes a housing defining a receptacle slot with a slot length and a slot width that is smaller than the longitudinal length of the slot. The receptacle unit also includes a piston having a profile substantially matching the receptacle slot. The piston is movable between an engaged position, in which the piston at least partially blocks the receptacle slot, and a retracted position, in which the piston is distal to the receptacle slot. The receptacle unit further includes a biasing member configured to bias the piston toward the engaged position.

The carrier unit includes a flange having a width greater than the longitudinal length of the receptacle slot, such that the flange covers or blocks the receptacle slot when adjacent thereto. The carrier unit also includes a lock tab offset from the flange. The lock tab has a tab length and tab width configured to allow the lock tab to pass through the receptacle slot of the receptacle unit.

A first angle of the carrier unit, relative to the receptacle unit, allows the lock tab to move the piston between the engaged position and the retracted position. A second angle of the carrier unit, relative to the receptacle unit, prevents passage of the lock tab through the receptacle slot, such that the carrier unit is selectively attachable to the receptacle unit. An accessory, such as a fastener point, is attached to, or formed as part of, the carrier unit.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
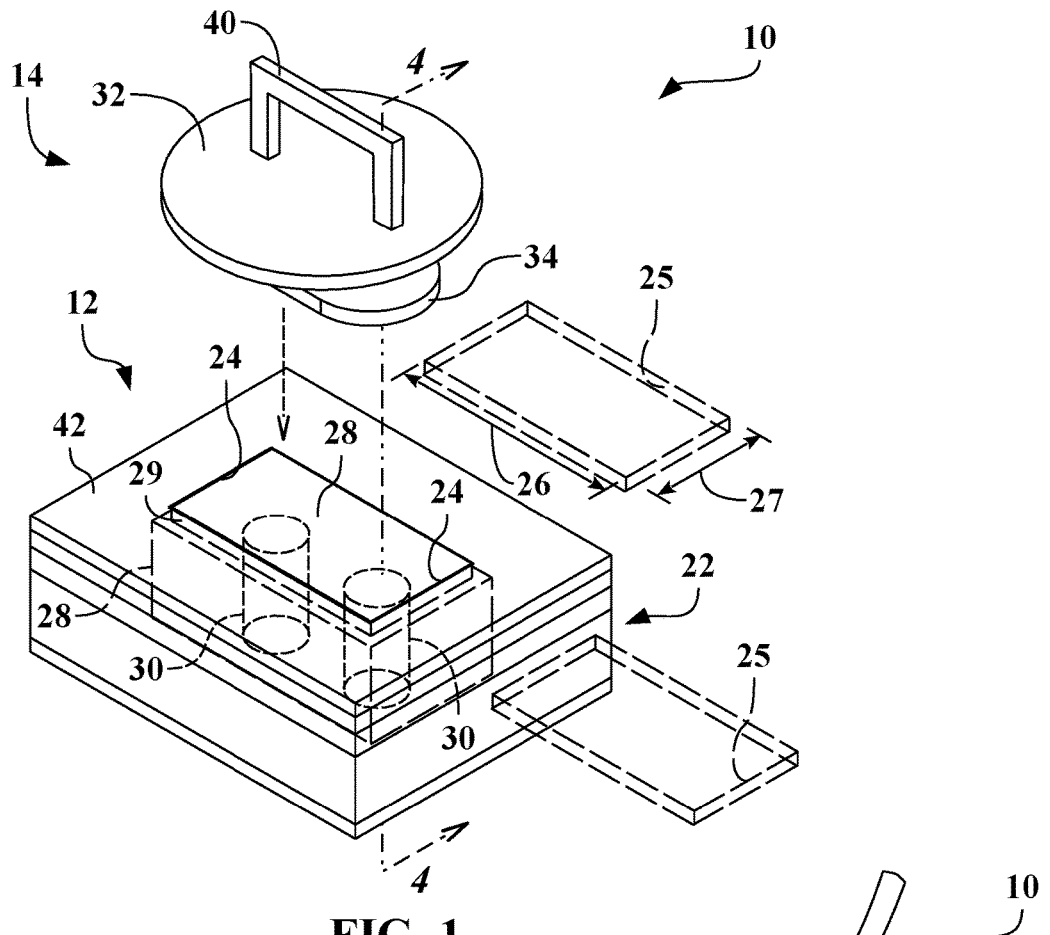
FIG. 1 is a schematic, isometric view of an attachment assembly having a detachable carrier unit or assembly configured for attachment to a receptacle or housing.

Referring to the drawings, like reference numbers correspond to like or similar components whenever possible throughout the several figures. There is shown in FIG. 1 an isometric view of a detachable attachment assembly 10, which may be incorporated into, for example and without limitation, a cargo bed of a pickup truck or other types of transportation equipment or cargo storage. The attachment assembly 10 includes a receptacle unit 12 and a carrier unit 14 that is selectively attachable to the receptacle unit 12.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

Figure 2:
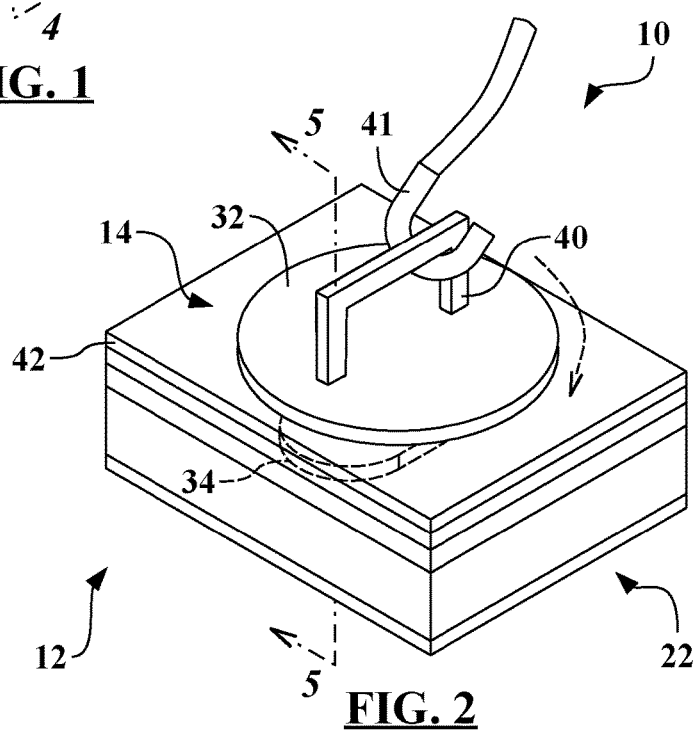
FIG. 2 is a schematic, isometric view of the attachment assembly with the carrier unit attached or mounted to the receptacle.

Referring also to FIG. 2, there is shown another isometric view of the attachment assembly 10. In the view of FIG. 1, the carrier unit 14 is removed or detached from the receptacle unit 12. However, in the view of FIG. 2, the carrier unit 14 is attached to the receptacle unit 12, via a quarter-twist of the carrier unit 14.

As shown in FIGS. 1 and 2, the receptacle unit 12 includes a housing 22 defining a receptacle slot 24. The housing 22 may be a portion of, for example, the walls, floor, or endgate of the cargo bed of a vehicle. As used herein, the term vehicle refers broadly to numerous mobile platforms, including planes, passenger and commercial automobiles, all-terrain vehicles (ATV), and the like.

Although only one receptacle unit 12 is illustrated in FIGS. 1 and 2, in many configurations several receptacle units 12, with several receptacle slots 24, may be incorporated into the same structure. For example, the walls or floor of cargo compartments may have one or more housings 22 defining several receptacles slots 24, such that the carrier unit 14 may be selectively placed into numerous locations, positions, and orientations.

Two additional receptacle slots 25 are illustrated in phantom in FIG. 1, and represent possible locations for alternative attachment points to which the carrier unit 14 may be selectively mated. The additional receptacle slots 25 may be defined in the same housing 22 or in separate structures.

As best viewed in FIG. 1, the receptacle slot 24 is oblong. The receptacle slot 24 has a slot length 26 and a slot width 27 that is smaller than the slot length 26, as also shown illustrated by the additional receptacle slots 25.

Figure 4:
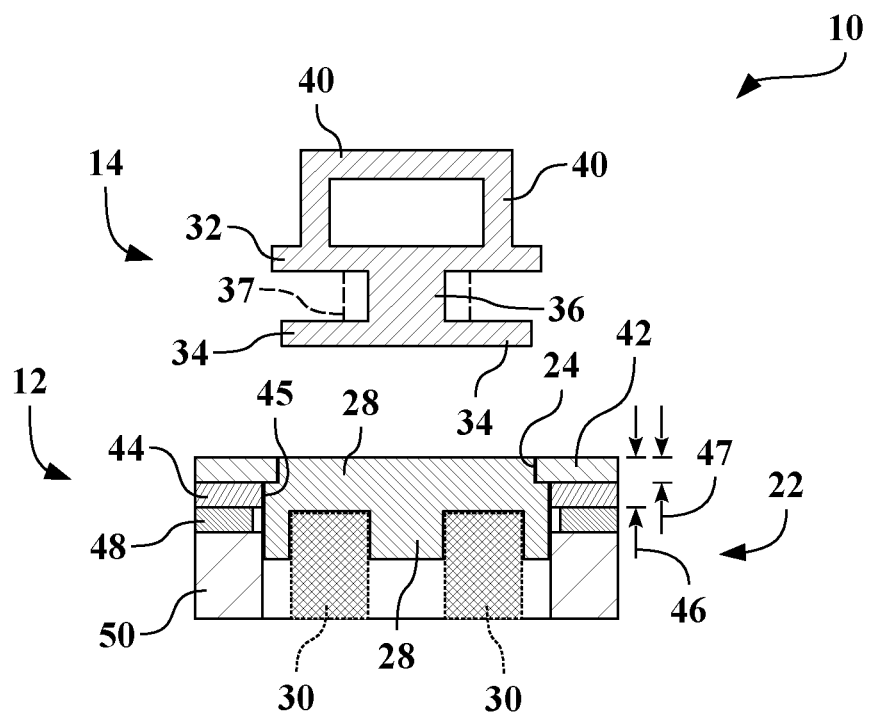
FIG. 4 is a schematic, cross-sectional view of the attachment assembly taken generally along a line 4-4 of FIG. 1.

The receptacle unit 12 includes a piston 28, which has a profile 29 substantially matching the receptacle slot 24. In FIG. 1, the piston 28 is largely hidden by portions of the housing 22 and is, therefore, illustrated in dashed lines. The piston 28 is movable between an engaged position, as shown in FIG. 1, and a retracted position, as hidden from view in FIG. 2 (the retracted position is also illustrated in FIG. 4).

The engaged position, in which the piston 28 at least partially blocks the receptacle slot 24, is illustrated in FIG. 1. In the engaged position, the piston 28 blocks ingress of debris into the receptacle slot 24. The retracted position, in which the piston 28 is distal to the receptacle slot 24, places the piston 28 away from the receptacle slot 24 and recessed into the housing 22.

At least one biasing member 30 is configured to bias or push the piston 28 toward the engaged position, such that the biasing member 30 tries to block the receptacle slot 24. The biasing member 30 is shown schematically (in dashed lines) in FIG. 1 but hidden from view in FIG. 2, and is also illustrated schematically in FIGS. 4 and 5. Therefore, the biasing member 30 causes the piston 28 to close or seal the receptacle slot 24 when the carrier unit 14 is removed or detached from the receptacle unit 12, as shown in FIG. 1. The biasing member 30 may be, for example and without limitation: a coil spring or torsion spring or a resilient rubber bushing.

As shown in FIGS. 1 and 2, the carrier unit 14 selectively attaches to the receptacle unit 12 by pushing, and then twisting, the carrier unit 14 into the receptacle slot 24 of the housing 22. The carrier unit 14 includes a flange 32 having a width greater than the longitudinal length of the receptacle slot 24, such that the flange 32 generally covers or blocks the receptacle slot 24 when the carrier unit 14 is attached to the receptacle unit 12, as shown in FIG. 2. When the carrier unit 14 is not attached, the piston 28 prevents ingress of debris into the receptacle slot 24.

A lock tab 34 is offset from the flange 32. The lock tab 34 has a tab length and tab width that allows it to pass through the receptacle slot 24 of the receptacle unit 12. Therefore, the lock tab 34 selectively depresses the piston 28 from the engaged position (i.e., within the receptacle slot 24) to the retracted position (i.e., recessed within or below the housing 22).

In the configuration of the attachment assembly 10 shown, the carrier unit 14 has a post 36 that spaces the lock tab 34 from the flange 32. The post 36 is best viewed in FIGS. 4 and 5.

As illustrated in FIG. 1, a first angle or orientation of the carrier unit 14, relative to the receptacle unit 12, allows the lock tab 34 to enter the receptacle slot 24 and to move the piston 28 between the engaged position and the retracted position. As illustrated in FIG. 2, a second angle or orientation of the carrier unit 14, relative to the receptacle unit 12, prevents passage of the lock tab 34 through the receptacle slot 24, such that the carrier unit 14 is held or retained by the receptacle unit 12.

An accessory is attached or affixed to the carrier unit 14, and may be considered part of the carrier unit 14 or a separate structure. The accessory may be, for example and without limitation, a fastener point 40 (as shown in FIGS. 1 and 2) or decorative or display item, such as a light, a badge, or combination thereof. When the carrier unit 14 is selectively locked or held into the receptacle unit 12, the fastener point 40 provides an attachment point for numerous structures, such as a rope and hook 41, which are shown schematically for illustrative and exemplary purposes only. Additional structures that may be attached at the fastener point 40 include, without limitation: tie-downs, bungee cords, D-rings, carabiners, clamps, or similar structures within the cargo compartment.

The accessory on the carrier unit 14 is illustrated as the fastener point 40, which may be a loop, D-ring, or other structure to which items may be fastened. However, in an alternative configuration, the accessory could be a light or an emblem. For example, a battery operated LED pop light may be attached to the flange 32, such that the carrier unit 14 can provide lighting to the cargo area when attached to the receptacle unit 12.

In many configurations, there may be several receptacle units 12 or several receptacle slots 24 located within the housing 22. Therefore, one or more carrier units 14 may be selectively placed, removed, and replaced in numerous locations across the cargo hold. Different accessories, including different types of fastener points 40 and lights, may be used simultaneously, and interchangeably, within the same cargo area.

Any references herein to uses for the attachment assembly 10 are illustrative and non-limiting. The debris protection provided by the attachment assembly 10 may have added benefits for exposed, or exterior, cargo areas. The piston 28 closes or blocks ingress of moisture, dirt, or the like into the receptacle slot 24 and the remainder of the housing 22.

The attachment assembly 10 may be incorporated into, for example and without limitation, the bed of a pickup truck or other exterior areas of vehicles. However, the attachment assembly 10 may also be used in interior settings, such as within a railroad boxcar, the cargo hold of an airplane, or the cargo compartments of SUV's, wagons, sedans, or other automobiles. The attachment assembly 10 may be useful in transportation applications, in particular, but is also useful in residential or commercial buildings having storage areas, including garages or workshops.

Figure 3:
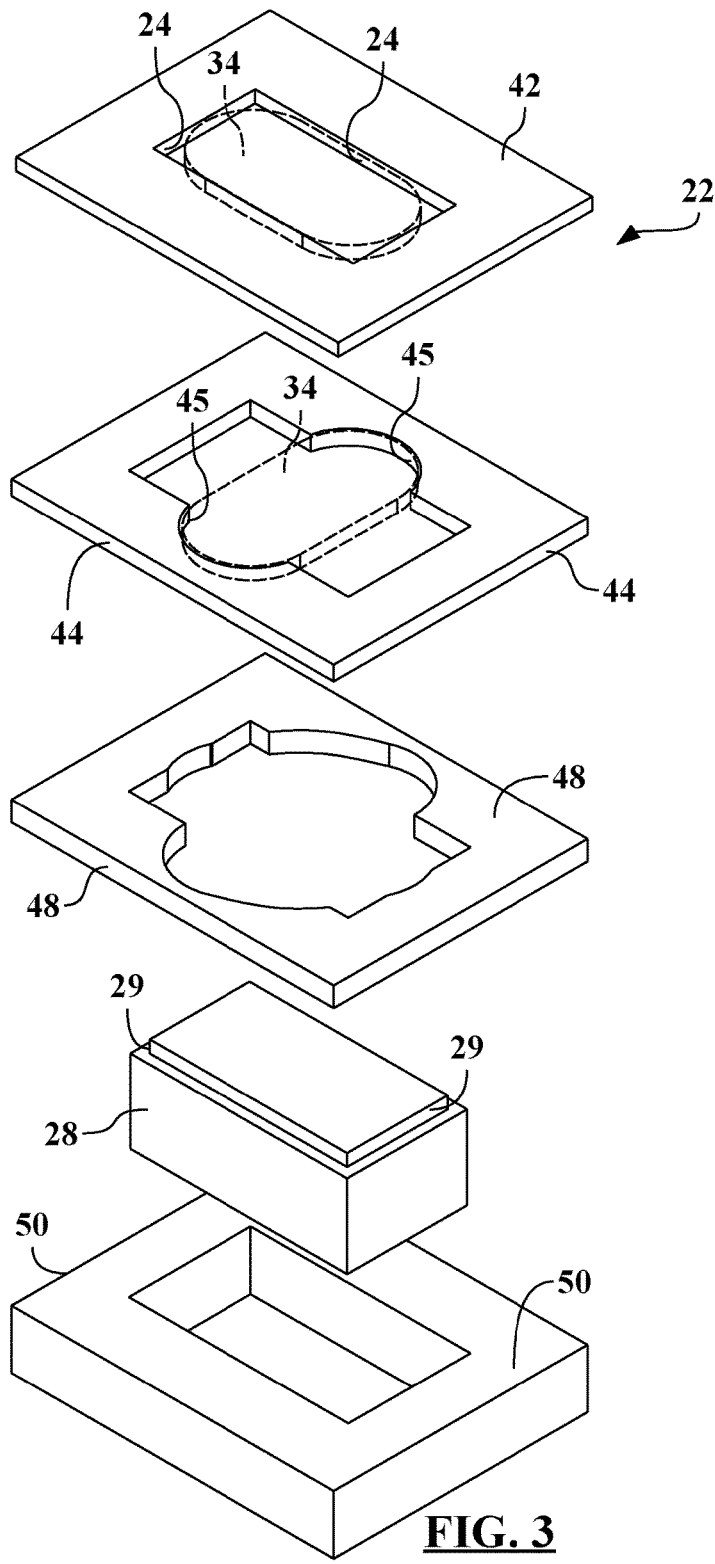
FIG. 3 is a schematic, exploded isometric view of portions of the receptacle.

Referring also to FIG. 3, and with continued reference to FIGS. 1-2, there is shown an exploded view of portions of one configuration for the housing 22 of the receptacle unit 12. A face plate 42 defines a front, or face, of the housing 22. In the configuration shown, a retention plate 44 is disposed adjacent the face plate 42 and includes a retention slot or retention notch 45. The face plate 42 and the retention plate 44 may be considered portions of the housing 22.

FIG. 3 further illustrates, in phantom, interaction between the lock tab 34 and portions of the housing 22. The lock tab 34 is shown within the receptacle slot 24 to illustrate entrance of the carrier unit 14 into the receptacle unit 12 while the lock tab 34 is oriented at the first angle, similar to the orientation show in FIG. 1. The lock tab 34 is also shown within the retention notch 45 of the retention plate 44 to illustrate the carrier unit 14 being mated and held to the receptacle unit 12 while the lock tab 34 is oriented at the second angle, similar to the orientation show in FIG. 2. Note that, in many configurations, the receptacle slot 24 and the piston 28 will more closely match the profile shape of the lock tab 34.

Figure 5:
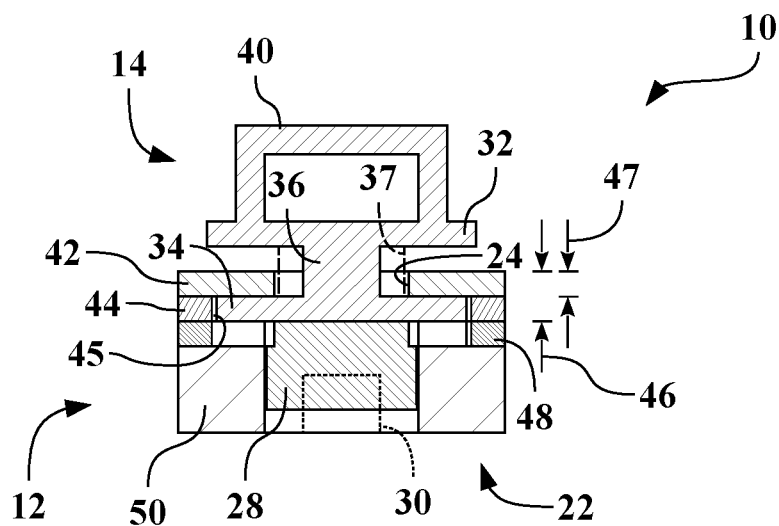
FIG. 5 is a schematic, cross-sectional view of the attachment assembly taken generally along a line 5-5 of FIG. 2.

Referring also to FIG. 4 and FIG. 5, there are shown additional views of the attachment assembly 10. FIG. 4 shows a cross-sectional view of the attachment assembly 10 with the carrier unit 14 detached from the receptacle unit 12, taken generally along a line 4-4 of FIG. 1; and FIG. 5 shows a cross-sectional view of the attachment assembly 10 with the carrier unit 14 attached to the receptacle unit 12, taken generally along a line 5-5 of FIG. 2.

The receptacle slot 24 is defined with a total depth or first depth 46 from the face plate 42 of the housing 22, and the retention notch 45 is defined with a second depth 47 from the face plate 42 that is smaller than the first depth 46. Therefore, as the lock tab 34 moves into the receptacle slot 24, by pushing the piston 28, it moves beyond the first depth 46

(which includes at least the face plate 42 and the retention plate 44), as shown in FIG. 4. After clearing the retention plate 44, the lock tab 34 (along with the remainder of the carrier unit 14) is rotated, such that the lock tab 34 is aligned with the retention notch 45 and may return to the second depth 47 under the spring force of the biasing member 30.

In some configurations, such as that shown in the figure, there may be a transition piece 48, which may include an incline or gradation, between the structures defining the first depth 46 and the second depth 47. The transition helps the lock tab 34 move smoothly from beyond the full extension of the receptacle slot 24 into the retention notch 45. In some configurations, the transition may be built into retention plate 44, such that the first depth 46 and second depth 47 are equal and the lock tab 34 simply needs to clear the face plate 42 before rotating to the second angle to lock itself within the receptacle unit 12.

In alternative configurations, the first depth 46 to the second depth 47 could also be defined by knobs, bumps, or ball-locks, as opposed to the retention notch 45, as long as there is sufficient resistance to rotation of the carrier unit 14 when installed (i.e., when the lock tab 34 is at the second angle) to retain the carrier unit 14 within the housing 22.

As shown in FIGS. 3-5, a guide piece 50 may be included in the housing 22 of the carrier unit 14. The guide piece 50 may align and guide the piston 28 moving between the engaged position, as shown in FIG. 4, and the retracted position, as shown in FIG. 5.

As illustrated in FIGS. 1-5, a diameter of the post 36 is smaller than the tab width of the lock tab 34. However, the diameter of the post 36 may be substantially equal to the tab width of the lock tab 34, as illustrated by an alternative post 37, which is shown with dashed lines in FIGS. 4 and 5. This may benefit insertion and removal of the carrier unit 14 by limiting the ability of the post 36 to slide sideways along the slot width.

In another alternative configuration, there may be a rubber or foam grommet or washer attached to the flange 32 or the face plate 42. The grommet or washer may be disposed around the flange or between the flange 32 and the face plate 42, such that it compresses or flexes while the carrier unit 14 is being installed into the receptacle unit 12 and then expands to limit ingress of debris or moisture while the carrier unit 14 is attached.

In the attachment assembly 10 shown, the first angle and the second angle of the lock tab 34 and the carrier unit 14 are substantially ninety degrees apart. Therefore, the carrier unit 14 attaches with a quarter-turn movement. This configuration allows the receptacle unit 12 and the carrier unit 14 to maintain orthogonal alignment with the cargo compartment into which the attachment assembly 10 is incorporated. However, other configurations and twist types may be used, including, without limitation: quarter-turn attachments with the lock tab having only one end (half of that shown in the FIGS. 1-5), third-turn, sixth-turn, or eighth-turn.

Figure 6A:
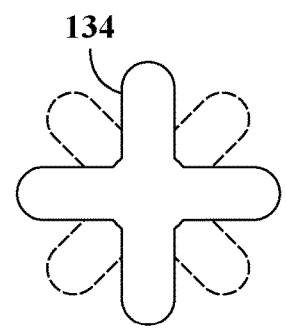
FIG. 6A is a schematic, end view of a four-prong lock tab for an attachment assembly utilizing eighth-turn twist motion.
Figure 6B:
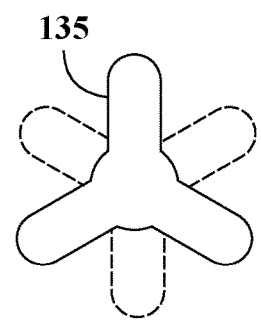
FIG. 6B is a schematic, end view of a three-prong lock tab for an attachment assembly utilizing sixth-turn twist motion.

Referring now to FIG. 6A and FIG. 6B, and with continued reference to FIGS. 1-5, there are shown additional configurations for attachment assemblies having alternative slot and tab arrangements and alternative twist patterns. FIG. 6 shows a lock tab 134 having four ends, such that the carrier unit associated therewith would rotate approximately forty-five degrees (eighth-turn) between the installed and uninstalled positions (as illustrated in dashed lines). FIG. 6B shows a lock tab 135 having three ends, such that the carrier unit associated therewith would rotate approximately sixty degrees (sixth-turn) between the installed and uninstalled positions (as illustrated in dashed lines).

The configurations shown in FIGS. 6A and 6B illustrate only the blades or tabs of the respective carrier units. Similar to the configurations shown in FIGS. 1-5, the pistons and receptacle slots would have similar shapes to those shown in FIGS. 6A and 6B. The dashed lines of FIGS. 6A and 6B may also be representative of the location of retention notches cooperating with the lock tab 134 and the lock tab 135.

The detailed description and the drawings or figures are supportive and descriptive of the subject matter discussed herein. While some of the best modes and other embodiments for have been described in detail, various alternative designs, configurations, and embodiments exist.

The invention claimed is:

1. A detachable attachment assembly, comprising:
   a receptacle unit, including:
      a housing defining a receptacle slot having a slot length and a slot width that is smaller than the slot length;
      a piston having a profile having a width that is smaller than its length and an area less than the receptacle slot, and movable between an engaged position, in which the piston at least partially blocks the receptacle slot, and a retracted position, in which the piston is recessed away from the receptacle slot; and
      a biasing member configured to bias the piston toward the engaged position;
   a carrier unit, including:
      a flange having a width greater than the slot length of the receptacle slot; and
      a lock tab offset from the flange and having a tab length and tab width sufficient to pass through the receptacle slot of the receptacle unit,
      wherein a first angle of the carrier unit, relative to the receptacle unit, allows the lock tab to move the piston between the engaged position and the retracted position, and
      wherein a second angle of the carrier unit, relative to the receptacle unit, prevents passage of the lock tab through the receptacle slot; and
   an accessory attached to the carrier unit.

2. The attachment assembly of claim 1, further comprising:
   a post spacing the lock tab from the flange.

3. The attachment assembly of claim 2, wherein the accessory is one of a fastener point and a light.

4. The attachment assembly of claim 3, wherein the first angle and the second angle are substantially ninety degrees apart.

5. The attachment assembly of claim 4, further comprising:
   a retention notch defined in the housing, wherein the receptacle slot has a first depth from a face of the housing, the retention notch has a second depth from the face of the housing, and the second depth is smaller than the first depth.

6. The attachment assembly of claim 5, wherein a diameter of the post is substantially equal to the tab width of the lock tab.

7. The attachment assembly of claim 1, further comprising:
   a retention notch defined in the housing, wherein the receptacle slot has a first depth from a face of the housing, the retention notch has a second depth from the face of the housing, and the second depth is smaller than the first depth.

8. The attachment assembly of claim 7, further comprising:

a post spacing the lock tab from the flange, wherein a diameter of the post is substantially equal to the tab width of the lock tab.

9. A detachable attachment assembly, comprising:
a receptacle unit, including:
  a housing defining a receptacle slot having a slot length and a slot width that is smaller than the slot length;
  a piston having a profile having a width that is smaller than its length and an area less than the receptacle slot, and movable between an engaged position, in which a portion of the piston is disposed within the receptacle slot such that the piston blocks the receptacle slot, and a retracted position, in which the piston is recessed from the receptacle slot; and
  a biasing member configured to bias the piston toward the engaged position;
a carrier unit, including:
  a flange having a width greater than the slot length of the receptacle slot; and
  a lock tab offset from the flange and having a tab length and tab width to pass through the receptacle slot of the receptacle unit,
  wherein a first angle of the carrier unit, relative to the receptacle unit, allows the lock tab to move the piston between the engaged position and the retracted position, and
  wherein a second angle of the carrier unit, relative to the receptacle unit, prevents passage of the lock tab through the receptacle slot; and
a fastener point attached to the carrier unit.

10. The attachment assembly of claim 9, further comprising:
a retention notch defined in the housing, wherein the receptacle slot has a first depth from a face of the housing, the retention notch has a second depth from the face of the housing, and the second depth is smaller than the first depth.

11. The attachment assembly of claim 10, further comprising:
a post spacing the lock tab from the flange.

12. The attachment assembly of claim 11, wherein the first angle and the second angle are substantially ninety degrees apart.

13. A detachable attachment assembly, comprising:
a receptacle unit, including:
  a housing defining a receptacle slot having a slot length and a slot width that is smaller than the slot length;
  a piston having a profile having a width that is smaller than its length and an area less than the receptacle slot, and movable between an engaged position, in which the piston substantially blocks the receptacle slot and prevents passage of moisture and debris through the receptacle slot, and a retracted position, in which the piston is recessed from the receptacle slot; and
  a biasing member configured to bias the piston toward the engaged position;
a carrier unit, including:
  a flange having a width greater than the slot length of the receptacle slot; and
  a lock tab offset from the flange and having a tab length and tab width to pass through the receptacle slot of the receptacle unit,
  wherein a first angle of the carrier unit, relative to the receptacle unit, allows the lock tab to move the piston between the engaged position and the retracted position, and
  wherein a second angle of the carrier unit, relative to the receptacle unit, prevents passage of the lock tab through the receptacle slot; and
a fastener point attached to the carrier unit.

14. The attachment assembly of claim 13, wherein the first angle and the second angle are substantially ninety degrees apart.

15. The attachment assembly of claim 14, further comprising:
a retention notch defined in the housing, wherein the receptacle slot has a first depth from a face of the housing, the retention notch has a second depth from the face of the housing, and the second depth is smaller than the first depth.

16. The attachment assembly of claim 15, further comprising:
a post spacing the lock tab from the flange, wherein a diameter of the post is substantially equal to the tab width of the lock tab.

* * * * *